United States Patent
Dunford et al.

(10) Patent No.: US 12,519,781 B2
(45) Date of Patent: Jan. 6, 2026

(54) COMPUTATIONAL ANALYSIS OVER DISTRIBUTED DATA

(71) Applicant: LIFEBIT BIOTECH LIMITED, London (GB)

(72) Inventors: Maria Dunford, London (GB); Pablo Prieto Barja, London (GB)

(73) Assignee: LIFEBIT BIOTECH LIMITED, London (GB)

( * ) Notice: Subject to any disclaimer, the term of this patent is extended or adjusted under 35 U.S.C. 154(b) by 0 days.

(21) Appl. No.: 18/749,296

(22) Filed: Jun. 20, 2024

(65) Prior Publication Data
US 2025/0007905 A1    Jan. 2, 2025

Related U.S. Application Data

(60) Provisional application No. 63/511,285, filed on Jun. 30, 2023.

(51) Int. Cl.
*H04L 9/40* (2022.01)

(52) U.S. Cl.
CPC .................................. *H04L 63/083* (2013.01)

(58) Field of Classification Search
CPC .................................................... H04L 63/083
See application file for complete search history.

(56) References Cited

U.S. PATENT DOCUMENTS 10,769,167 B1 * 9/2020 Barja .................... G06F 16/182
11,061,799 B1 * 7/2021 Schiel ................. G06F 11/0712
2014/0012843 A1 * 1/2014 Soon-Shiong .......... H04L 67/12
　　　　　　　　　　　　　　　　　　　　　　　707/736
2015/0347480 A1 * 12/2015 Smart ..................... G06F 16/26
　　　　　　　　　　　　　　　　　　　　　　　707/743
2018/0046753 A1 * 2/2018 Shelton ................... G16H 80/00
2018/0077135 A1 * 3/2018 Wardman ............ H04L 63/0421
2019/0065679 A1 * 2/2019 Powers ................. H04L 63/083
2019/0190921 A1    6/2019 Rieser et al.
2019/0278760 A1 * 9/2019 Smart .................. G06F 16/2264
2019/0317949 A1   10/2019 Florissi et al.
2020/0234794 A1 * 7/2020 Esteves-Veríssimo .....................
　　　　　　　　　　　　　　　　　　　　　　　G06F 21/602
2021/0150076 A1 * 5/2021 Hinkle ..................... G06F 21/31
2021/0390154 A1 * 12/2021 Wagner ............... G06F 16/9538
(Continued)

OTHER PUBLICATIONS

"Extended European Search Report for EP24184421.6, mailed on Nov. 12, 2024".

*Primary Examiner* — Harris C Wang
(74) *Attorney, Agent, or Firm* — Dorsey & Whitney LLP

(57) ABSTRACT

A method for secure analysis of distributed data includes receiving a request from a user to perform a data analysis operation. The data analysis operation utilizes first data accessible by a first secure research environment and second data accessible by a second secure research environment. The method further includes authenticating the user at the first secure research environment and the second secure research environment, communicating a first query for the first data to the first secure research environment, and communicating a second query for the second data to the second secure research environment. The method further includes receiving, from a secure compute environment in communication with the first secure research environment and the second secure research environment, results from the data analysis operation.

19 Claims, 8 Drawing Sheets

(56) References Cited

U.S. PATENT DOCUMENTS

| | | | |
|---|---|---|---|
| 2022/0068050 A1* | 3/2022 | Kibbar | G01M 17/007 |
| 2022/0130493 A1* | 4/2022 | Turner | G16H 70/40 |
| 2023/0267485 A1* | 8/2023 | Levitt | G06Q 30/0203 |
| | | | 705/7.19 |
| 2024/0193304 A1* | 6/2024 | Karr | G06F 3/0661 |
| 2024/0211599 A1* | 6/2024 | Koo | G06F 21/554 |

* cited by examiner

COMPUTATIONAL ANALYSIS OVER DISTRIBUTED DATA

CROSS-REFERENCE TO RELATED APPLICATIONS

This application claims the benefit of priority to U.S. Provisional Application No. 63/511,285, filed Jun. 30, 2023, and titled "Computational Analysis over Distributed Data," the disclosure of which is incorporated by reference herein in its entirety.

FIELD

This disclosure relates to a system for conducting computational analysis over distributed data.

BACKGROUND

The analysis of large data sets may involve large amounts of sensitive data. For example, gene sequences (e.g., genomics data coming from next generation sequencing (NGS) machines) are highly complex, voluminous, and personal data, such as personal information, health history, and gene data.

SUMMARY

A method includes receiving, at a distributed analysis service, a request from a user to perform a data analysis operation, wherein the data analysis operation utilizes first data accessible by a first secure research environment and second data accessible by a second secure research environment. The method further includes authenticating the user at the first secure research environment and the second secure research environment, communicating, by the distributed analysis service, a first query for the first data to the first secure research environment, and communicating, by the distributed analysis service, a second query for the second data to the second secure research environment. The method further includes receiving, at the distributed analysis service, from a secure compute environment in communication with the first secure research environment and the second secure research environment, results from the data analysis operation, where the results are generated at the secure compute environment using the first data received at the secure compute environment from the first secure research environment and the second data received at the secure compute environment from the second secure research environment.

In some examples, the distributed analysis service, the first secure research environment, the second secure research environment, and the secure compute environment communicate via a private network connection.

In some examples, authenticating the user at the first secure research environment and the second secure research environment comprises accessing authentication data located at the distributed analysis service.

In some examples, the first secure research environment is associated with a first research organization and the second secure research environment is associated with a second research organization separate from the first research organization.

In some examples, the first data is data at the first secure research environment having a characteristic, wherein the second data is data at the second secure research environment having the characteristic.

In some examples, the method further includes configuring compute resources of the secure compute environment, where the compute resources of the secure compute environment generate the results.

In some examples, the method further includes configuring the secure compute environment such that the secure compute environment is inaccessible during generation of the results at the secure compute environment.

In some examples, authenticating the user at the first secure research environment and the second secure research environment comprises generating a first authentication token for communication to the first secure research environment and generating a second authentication for communication to the second secure research environment.

A system includes a distributed analysis service configured to receive, from a user, a request to perform a data analysis operation, where the data analysis operation utilizes first data accessible by a first secure research environment and second data accessible by a second secure research environment. The distributed analysis service is further configured to authenticate the user at the first secure research environment and the second secure research environment, communicate a first query for the first data to the first secure research environment, and communicate a second query for the second data to the second secure research environment. The system further comprises a secure compute environment in communication with the distributed analysis service, the first secure research environment, and the second secure research environment. The secure compute environment is configured to generate results of the data analysis operation using the first data received from the first secure research environment and the second data received from the second secure research environment. The secure compute environment is further configured to provide the results of the data analysis operation to the distributed analysis service.

In some examples, the distributed analysis service is further configured to communicate with the first secure research environment and the second secure research environment using a private network connection.

In some examples, the first secure research environment is associated with a first research organization and the second secure research environment is associated with a second research organization separate from the first research organization.

In some examples, the distributed analysis service is further configured to authenticate the user at the first secure research environment and the second secure research environment by accessing authentication data located at the distributed analysis service.

One or more non-transitory computer readable media are encoded with instructions which, when executed by one or more processors of a distributed analysis service, cause the distributed analysis service to perform operations. The operations include receiving a request from a user to perform a data analysis operation, where the data analysis operation utilizes first data accessible by a first secure research environment and second data accessible by a second secure research environment. The operations further include authenticating the user at the first secure research environment and the second secure research environment, communicating a first query for the first data to the first secure research environment, and communicating a second query for the second data to the second secure research environment. The operations further include receiving, from a secure compute environment in communication with the first secure research environment and the second secure research environment, results from the data analysis operation, where the results are generated at the secure compute environment using the first data received at the secure compute environment from the first secure research environment and the second data received at the secure compute environment from the second secure research environment.

In some examples, the distributed analysis service communicates with the first secure research environment, the second secure research environment, and the secure compute environment via a private network connection.

In some examples, authenticating the user at the first secure research environment and the second secure research environment comprises accessing authentication data located at the distributed analysis service.

In some examples, the first secure research environment is associated with a first research organization and the second secure research environment is associated with a second research organization separate from the first research organization.

In some examples, the first data is data at the first secure research environment having a characteristic, where the second data is data at the second secure research environment having the characteristic.

In some examples, the operations further include configuring compute resources of the secure compute environment, where the compute resources of the secure compute environment generate the results.

In some examples, the operations further include configuring the secure compute environment such that the secure compute environment is inaccessible during generation of the results at the secure compute environment.

In some examples, authenticating the user at the first secure research environment and the second secure research environment includes generating a first authentication token for communication to the first secure research environment and generating a second authentication token for communication to the second secure research environment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

DETAILED DESCRIPTION

Figure 1:
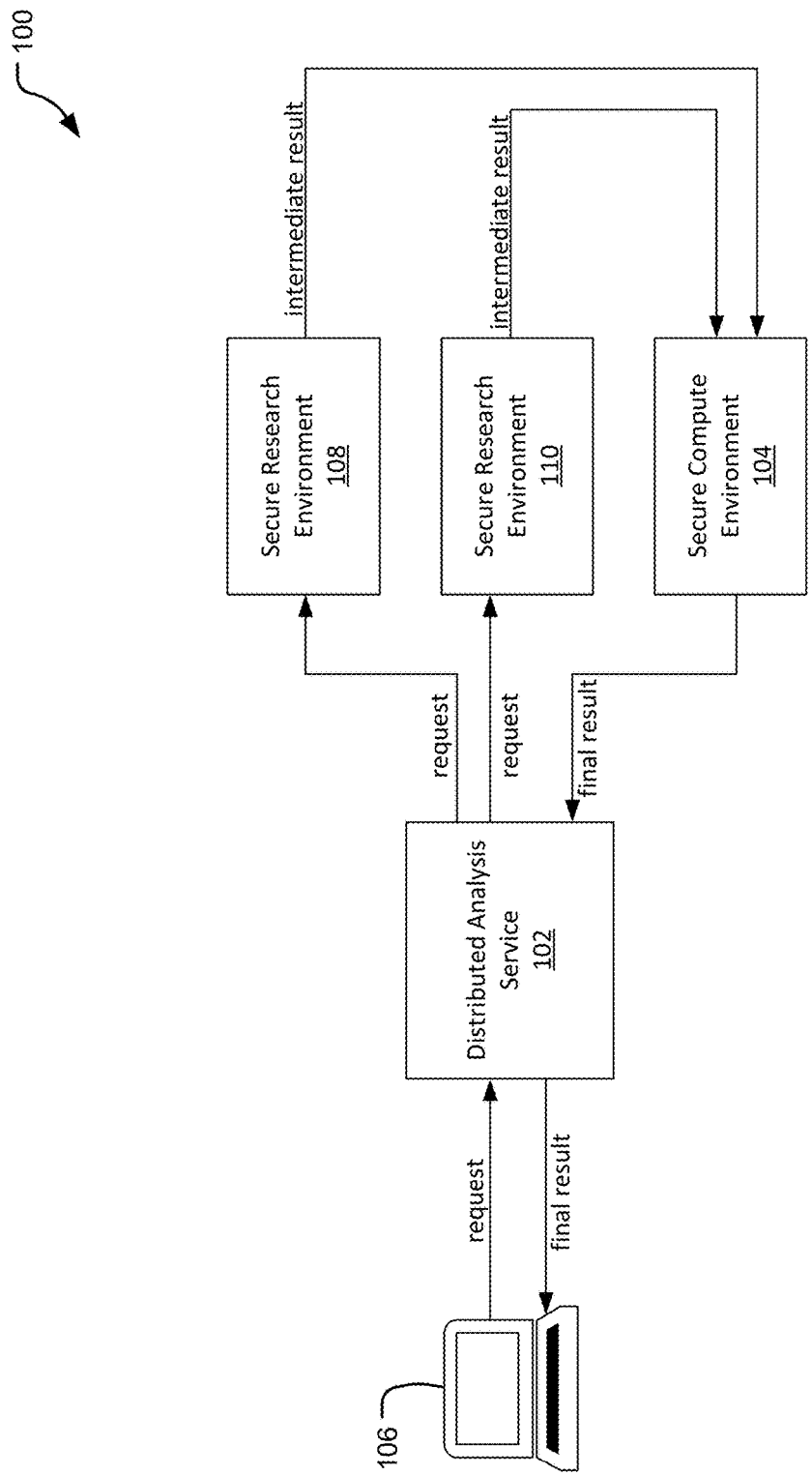
FIG. 1 illustrates an example distributed analysis service in communication with a user device, secure research environments, and a secure compute environment, in accordance with various embodiments of the disclosure.

Researchers may benefit from the analysis of large data sets including data collected by and/or held at various different organizations. Due to the sensitive nature of some such data, such organizations may prefer greater control over the data, such as by performing as much analysis as possible using resources associated with the organization, controlling access to the data and/or portions of the data (e.g., personal information associated with health data), and the like. Further, movement of large data sets (e.g., by copying data and sending the data to the machine or machines performing the analysis) uses large amounts of computing resources, complicates access to data, and may result in additional costs, such as cloud egress charges.

The present disclosure relates generally to a system or service facilitating secure data analysis operations across distributed data sources. For example, a distributed analysis service described herein may connect various secure research environments associated with different research organizations (e.g., universities, public health organizations, medical systems, corporations, and the like) and may allow users with access to the distributed analysis service to perform data analysis operations utilizing data associated with the different research organizations hosted and/or stored within secure research environments connected to the distributed analysis service. For example, a researcher can utilize the system to generate queries and analysis that can be performed on data that is hosted within a secure research environment, without having to copy or transmit the data across the network, or otherwise change security requirements for the data, or the like. Accordingly, the data is less likely to be accessed or otherwise obtained by parties who should not have access to such data.

Data analysis operations facilitated by the distributed analysis service may include, for example and without limitation, querying existing datasets to extract data with specific characteristics, perform computations on data having specific characteristics and/or established data sets, and the like. Such data analysis operations may be streamlined by use of the distributed analysis service, which may allow a user to access such data across different organizations from one end point. For example, the user may access data across organizations without having to separately access systems associated with each research organizations or generate separate queries for each research organization to access similar data. Accordingly, in various examples, the user may run the same query across two or more research environments, such that the query can be run simultaneously on data associated with different organizations.

The distributed analysis service may facilitate such data analysis operations by allowing data to be initially processed within a secure research environment before the results from the individual secure research environments are aggregated to provide a final result to an initial user of the distributed analysis service. A secure research environment may be a computational environment or grouping of computing resources associated with a research organization. For example, computing resources associated with a research organization may be utilized, owned, leased, or otherwise used by a research organization. Additionally, such environments or groupings of computing resources may be protected, e.g., by requiring access credentials or the like to access data and/or computational resources within the secure research environment. Generally, data within a secure research environment may include data utilized for research purposes including, in some examples, medical or other personal or protected data. Accordingly, research organizations may make data available for analysis more securely and researchers may perform analysis across data from different research organizations (which typically would be hesitant to share such sensitive data), allowing more robust findings, new or additional insights, and the like. Further, the distributed analysis service may allow faster completion of the data analysis operations, as less data is transmitted over various networks to complete analysis.

In various examples, the distributed analysis service may further connect to a secure compute environment separate from the research organizations and in communication with the secure research environments. Such a secure compute environment may be utilized as a "safe haven" or neutral secure environment associated with the distributed analysis service. That is, the secure compute environment may be connected to the distributed analysis service and the secure research environments through a private or secure network (e.g., a private network connection) and may be inaccessible by end users. Accordingly, data aggregated at the secure compute environment may have enhanced security as compared to unsecured connections. For example, fewer or no parties may be able to access such data, decreasing the chances that the data is accessed by unauthorized parties. Generally, the secure research environments may transmit results of initial data analysis operations to the secure compute environment. The secure compute environment may aggregate the results to provide a final result. The final result may then be transmitted back to the distributed analysis service for communication to the end user. Where only the results of the initial data analysis operations are transmitted to the secure research environment, raw data utilized in initial data analysis operations may remain within a secure research environment, further protecting the raw data and reducing the risk of unintended disclosure of sensitive data.

The distributed analysis service may, in various examples, include other features that streamline data analysis operations for users of the distributed analysis service, provide enhanced security for sensitive data collected and/or stored by research organizations, and/or provide other benefits. For example, the distributed analysis service may manage access credentials for the end user to each of the connected research organizations. In some examples, a user may access the distributed analysis system (e.g., using credentials assigned to the user) and the distributed analysis system may authenticate the user's credentials to access systems associated with the research organizations. Accordingly, the user may access systems of multiple research organizations securely, without having to separately access and authenticate for each research organization. Further, the distributed analysis service may communicate with research compute environments and/or other secure compute environments via a private network, such that sensitive data is not transmitted via a public network connection.

Various embodiments of the present disclosure will be explained below in detail with reference to the accompanying drawings. Other embodiments may be utilized, and structural, logical, and electrical changes may be made without departing from the scope of the present disclosure.

Turning now to the drawings, FIG. 1 illustrates a distributed analysis service 102 in communication with a user device 106, secure research environments 108 and 110, and a secure compute environment 104. The distributed analysis service 102 may generally communicate with the user device 106, the secure research environments 108 and 110, and the secure compute environment 104 to facilitate data analysis operations. For example, the distributed analysis service 102 may receive a request from the user device 106 to perform a data analysis operation utilizing first data stored within the secure research environment 108 and second data stored within the secure research environment 110. The secure research environment 108 and the secure research environment 110 may perform initial data analysis on the first data and the second data, respectively, and may transmit results from such initial analysis to the secure compute environment 104. The secure compute environment 104 may generally aggregate the results of the initial data analysis to complete the data analysis operation and transmit the final results back to the distributed analysis service 102. The distributed analysis service 102 may then provide results to the requesting user device 106.

Generally, the distributed analysis service 102 allow a user to conduct data analysis operations including data belonging to multiple and often non-related organizations (e.g., research institutions, medical groups, public health organizations, and the like). The distributed analysis service 102 may receive requests from user devices and may communicate with various research organizations (e.g., secure research environment 108 and secure research environment 110) and one or more secure compute environments (e.g., secure compute environment 104) to complete the data analysis operations requested by the user device.

The distributed analysis service 102 may be implemented using various combinations of computing resources. In various examples, the distributed analysis service 102 may be implemented by one or more servers, cloud computing resources, and/or other computing devices. For example, the distributed analysis service 102 may include or utilize one or more hosts or combinations of compute resources, which may be located, for example, at one or more servers, cloud computing platforms, computing clusters, and the like. The distributed analysis service 102 may utilize various processing resources to facilitate data analysis operations across distributed data sources. For example, the distributed analysis service 102 may utilize or include one or more processors, such as a CPU, GPU, and/or programmable or configurable logic. The distributed analysis service 102 may further include memory and/or storage locations to store program instructions for execution by the processor and various data utilized by the distributed analysis service 102. Such distributed computing resources may be indirectly connected such that storage and/or processing resources may communicated via wired or wireless networks or the like.

Figure 2:
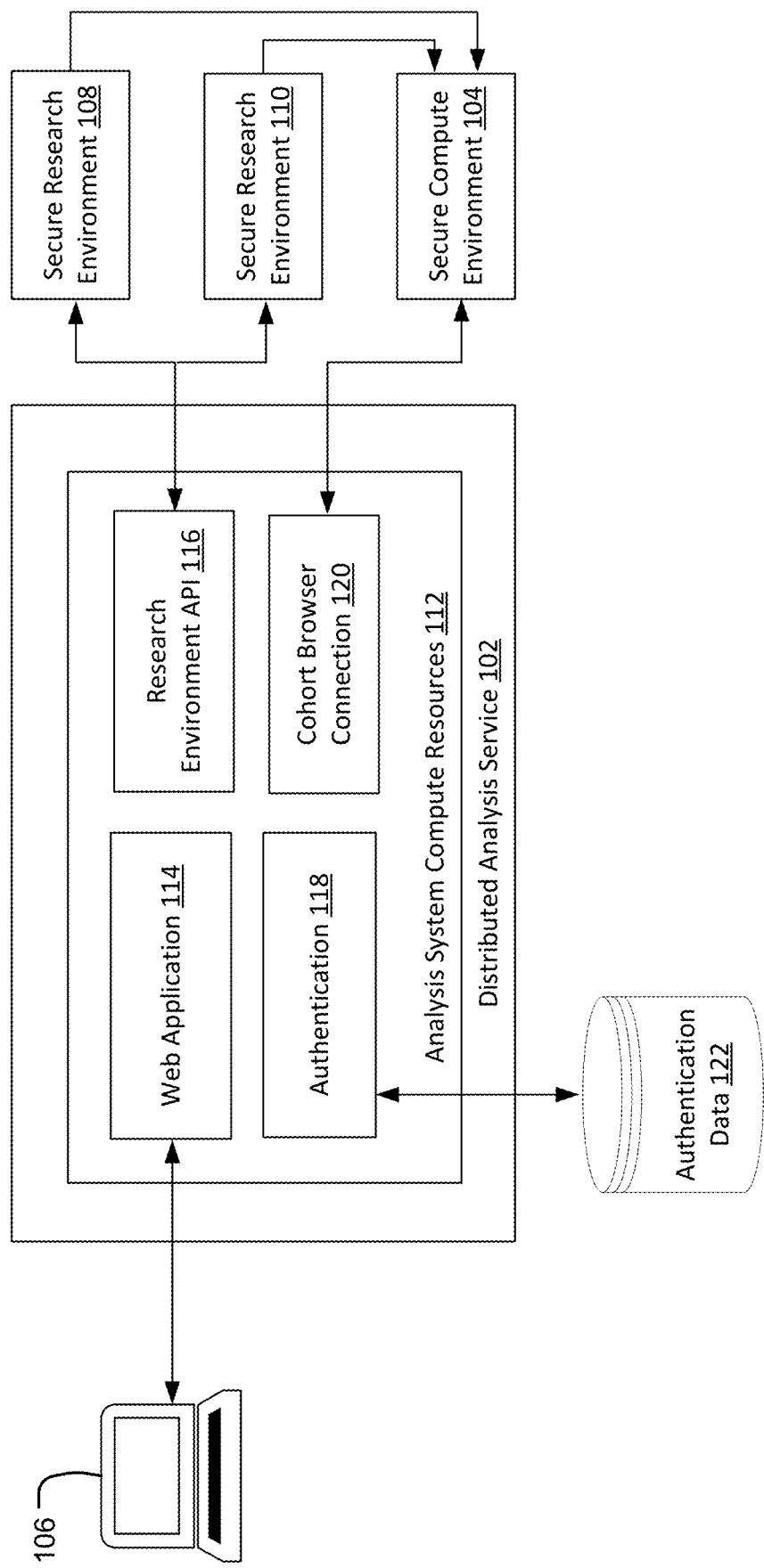
FIG. 2 is a block diagram of an example distributed analysis service, in accordance with various embodiments of the disclosure.

With reference to FIG. 2, the distributed analysis service 102 may include various components executing on analysis system compute resources 112. In various examples, the analysis system compute resources 112 may communicate with one another via a private subnet and/or may execute within a cloud environment within a container, virtual machine, or other execution environment associated with the distributed analysis service 102. The analysis system compute resources 112 may be dynamic. That is, the processors, memory, and/or other compute resources allocated to the distributed analysis service 102 may change over time, such as based on resource usage of the distributed analysis service 102. For example, when more requests are made to the distributed analysis service 102, additional processors may be added to the analysis system compute resources 112 within a cloud environment hosting the distributed analysis service 102. In some examples, some or all of the analysis system compute resources 112 may be located outside of a cloud computing environment, such as at a local server or local compute resources dedicated to the distributed analysis service 102.

Generally, the components shown in FIG. 2 may execute on the analysis system compute resources 112 to implement various functions of the distributed analysis service 102. In the example shown in FIG. 2, the distributed analysis service 102 includes functionality for a web application 114, a research environment application programming interface (API) 116, authentication 118, and a cohort browser connection 120. Collectively, such components provide the ability for the distributed analysis system 102 to receive requests for data analysis operations from a user device 106 and to coordinate such data analysis operations between secure research environments 108, 110 and a secure compute environment 104.

The distributed analysis service 102 may implement a web application 114. The web application 114 may generally communicate with the user device 106 and/or other user devices in connection with the distributed analysis service 102 to receive requests for data analysis operations and other information (e.g., access credentials) from user devices. The web application 114 may further configure user interfaces for display at the user device 106 and communicate various information (e.g., status of data analysis operations, results from data analysis operations, and the like) to the user device 106 via such interfaces. The web application 114 may communicate with other components of the distributed analysis service 102 to provide information received from the user device 106, access information for transmittal to the user device 106, and the like.

In various examples, the web application 114 may further provide interfaces allowing the user device 106 to view or browse data at the secure research environments 108, 110. For example, the web application 114 may display types of data available at the secure research environments 108, 110 such that a user may construct a query for specific types of data available at the secure research environments 108, 110. In some examples, the web application 114 may display only the types of data that the user device 106 is authorized to access from the secure research environments 108, 110.

Authentication 118 may generally authenticate the user device 106 to proceed with requested data analysis operations and/or to determine parameters or settings applicable to data analysis operations which may be requested by the user device 106. For example, when the user device 106 accesses the distributed analysis service 102, authentication 118 may authenticate credentials associated with the user device 106 to provide access to the distributed analysis service 102 (e.g., to allow the user device 106 to make requests for data analysis operations via the distributed analysis service 102). In various examples, authentication 118 may further authenticate the user device 106 to access the secure research environments 108 and 110. For example, authentication 118 may access authentication data 122, which may include authentication information for the secure research environments 108 and 110. Such authentication data 122 may be stored in various types of data structures, such as a database, and may be located within the distributed analysis service 102 and/or at other locations accessible by the distributed analysis service 102. In various examples, authentication 118 may generate access tokens associated with the user device 106 which may be provided with requests to the secure research environments 108 and 110 to allow access to the secure research environments 108 and 110.

In some examples, user credentials may be associated with different levels of access or tiers to the secure research environments 108 and 110, and such levels of access may be communicated to the secure research environments 108 and 110 along with user requests. For example, some users may have permissions to access only certain datasets related to certain conditions, only anonymized data, only a certain amount of data, and the like. In some examples, such levels of access may be utilized within the distributed analysis service 102 to configure various user interfaces presented at the user device 106 for the user to request various data analysis operations. For example, the user interface may include options for the user to request data analysis operations only including data to which the user has access based on the user's authentication credentials.

The research environment API 116 may generally communicate with the secure research environment 108 and the secure research environment 110 to coordinate data analysis operations utilizing data at the secure research environment 108 and the secure research environment 110. For example, the research environment API 116 may generate queries to retrieve data from the secure research environment 108 and the secure research environment based on the request for the data analysis operation received from the user device 106. The research environment API 116 may transmit such queries to the secure research environment 108 and 110 via a private network connecting the distributed analysis service 102 to the secure research environment 108 and the secure research environment 110. In various examples, the research environment API 116 may further transmit instructions for initial analysis of the data retrieved by the queries, where the initial analysis is to be performed at the secure research environment 108 and the secure research environment 110. Such instructions may include identification of the secure compute environment 104 such that the secure research environment 108 and the secure research environment 110 may transmit intermediate results and/or data to the secure compute environment 104 for additional analysis. The research environment API 116 may further provide instructions for aggregation of such intermediate results for completion of data analysis operations via the secure research environments 108 and 110 and/or directly to the secure compute environment 104.

The research environment API 116 may further orchestrate data analysis at the secure research environment 108 and the secure research environment 110. For example, the research environment API 116 may utilize a queuing service and/or other method of ordering queries to the secure research environment. Queries may be queued by the research environment API 116 using a variety of methods, such as by adding incoming queries to a queue using a first in, first out (FIFO) ordering for transmitting queued queries to the secure research environments 108 and 110. In various examples, the research environment API 116 may further track the status of various queries provided to the secure research environments 108 and 110 and may provide the status of the queries to the distributed analysis service 102. Such statuses may then be provided to the user device 106 (e.g., through a user interface configured by the web application 114). The research environment API 116 may also track the status of data analysis operations at the secure compute environment 104, in some examples.

The cohort browser connection 120 may generally communicate with the secure compute environment 104 to receive data and/or final results of other data analysis operations requested by the user device 106. The cohort browser connection 120 may also provide instructions for aggregation of intermediate results and/or data to the secure research environment 104 and provide an aggregated view of the results to the user device 106. In various examples, the cohort browser connection 120 may further coordinate with the secure compute environment 104 to ensure removal of low level and/or identifying data from the aggregated data returned to the distributed analysis system 102. In some examples, rules for data anonymization may be provided by individual research organizations, may be based on access privileges of the user with respect to individual research organizations, and the like.

The components and architecture of the distributed analysis system 102 shown in FIG. 2 are exemplary. In various examples, the distributed analysis system 102 may include additional and/or different components not shown in FIG. 2.

Returning to FIG. 1, the secure research environment 108 and the secure research environment 110 may generally receive requests for data analysis operations (e.g., queries) from the distributed analysis system 102 and may process such queries to provide data and/or intermediate results to the secure compute environment 104 for aggregation and/or further analysis. Generally, the secure research environment 108 and the secure research environment 110 include processing resources, memory resources, and storage resources. In various examples, the secure research environment 108 and the secure research environment 110 may be implemented via cloud computing infrastructure.

Figure 3:
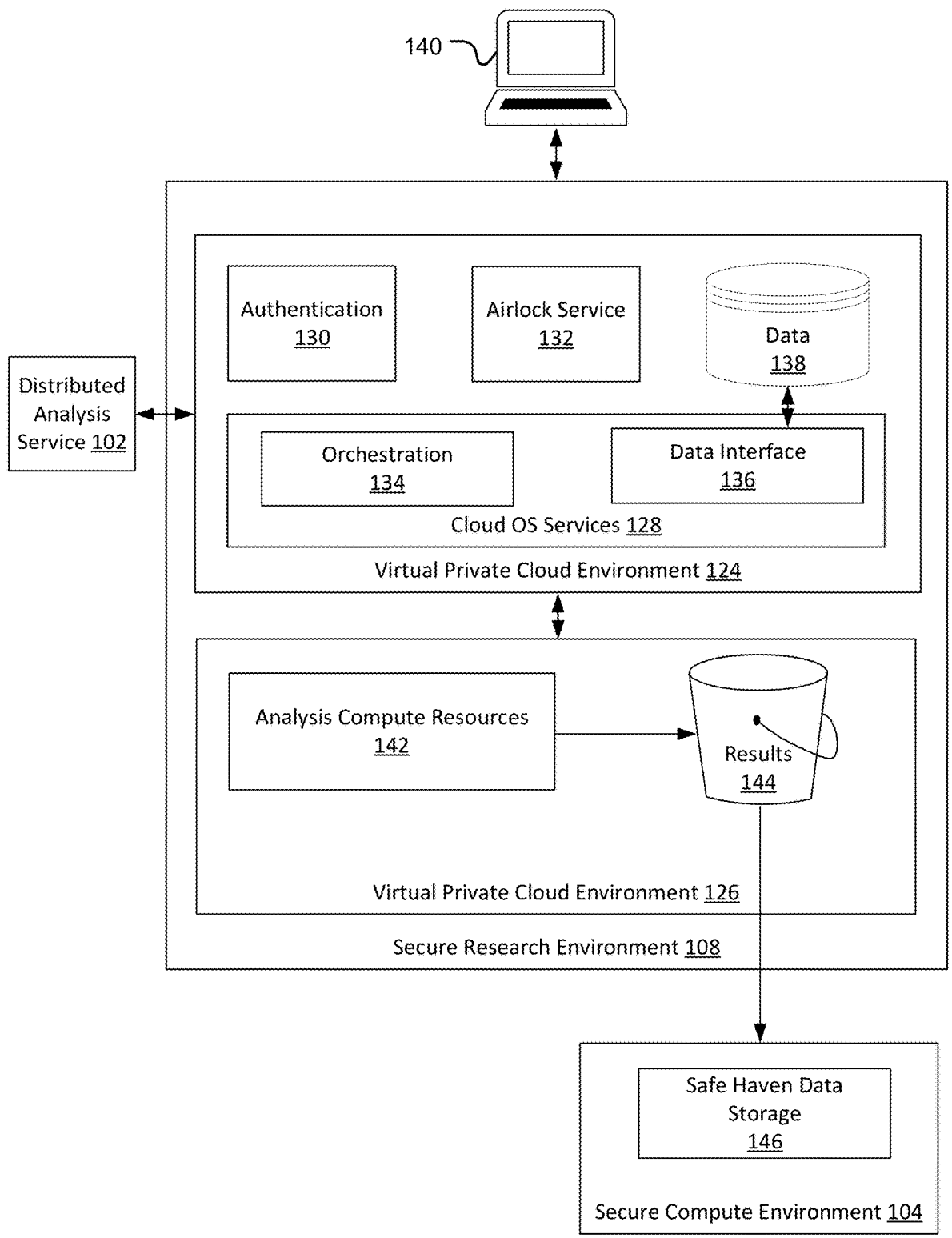
FIG. 3 is a block diagram of an example secure research environment, in accordance with various embodiments of the disclosure.

With reference to FIG. 3, the secure research environment 108 may communicate with the distributed analysis service 102, various user devices (e.g., user device 140), and/or the secure compute environment 104, which may include safe haven data storage 146. In various examples, the safe haven data storage 146 may be accessible by computational resources of the secure compute environment 104 for analysis of the data stored within the safe haven data storage 146. The secure research environment 108 shown in FIG. 3 includes a virtual private cloud environment 124 and a virtual private cloud environment 126. In some other examples, all of the components shown in the secure research environment 108 may be located at a single virtual private cloud or other execution environment (e.g., at a private server or group of private servers associated with the research organization associated with the secure research environment 108).

In various examples, the virtual private cloud environment 124 may include various components for communication with the distributed analysis service 102, user devices 140 of users associated with the research institution, querying for data of the research organization, and/or orchestrating analysis of the data of the research organization. The virtual private cloud environment 126 may be in communication with the virtual private cloud environment 124 via a virtual private cloud connection. The virtual private cloud environment 126 may include resources for performing analysis of the data of the organization, such as analysis compute resources 142 and storage locations for results 144.

In various examples, the analysis compute resources 142 and storage locations for results 144 may be dynamically allocated (e.g., by cloud OS services 128) based on the parameters of data analysis to be performed within the virtual private cloud environment 126. For example, analysis compute resources 142 may be allocated responsive to a data analysis request and may be released after completion of the data analysis. Storage locations for results 144 may also be temporarily allocated to store results of such data analysis until the results are provided to safe haven data storage 146 and/or the secure compute environment 104.

The analysis compute resources 142 within the virtual private cloud environment 126 may generally be contained within the virtual private cloud environment 126 within a container, virtual machine, secure cluster, or other execution environment within the virtual private cloud environment 126. In some examples, the analysis compute resources 142 may include cloud computing resources and/or other accessible resources, such as servers and/or computing clusters associated with the research organization. Generally, the cloud OS services 128 (e.g., orchestration 134) may determine which compute resources to include in analysis compute resources 142 based on various factors such as complexity of data analysis operations, cost of additional compute resources (e.g., the cost associated with allocating additional processing resources within a cloud computing environment), jobs or processes already executing on the compute resources, and the like.

The virtual private cloud environment 124 may include various components for communication with the distributed analysis service 102, retrieving data at the secure research environment 108, and/or configuring and monitoring initial analysis of the retrieved data. Such components may execute at various compute resources of the virtual private cloud environment 124 which may include, in various examples, processing and/or memory resources located at various cloud computing environments and/or other locations, such as servers or other compute resources owned or utilized by the research organization associated with the secure research environment 108. For example, the virtual private cloud environment 124 may include authentication 130, an airlock service 132, and cloud OS services 128. The cloud OS services 128 may generally include orchestration 134 and a data interface 136 to access data 138 of the research organization. In various examples, the components within the virtual private cloud environment 124 may communicate via a private subnet or other secure networking protocol.

Authentication 130 may generally communicate with the distributed analysis service 102 (e.g., with authentication 118 of the distributed analysis service 102) to authenticate users to access the secure research environment 108. For example, authentication 130 may verify tokens or other credentials provided by authentication 118 of the distributed analysis service 102 associated with a user attempting to access data at the secure research environment 108. In various examples, authentication 130 may further provide information to the distributed analysis service 102 regarding permissions for specific users and the like to control access to the secure research environment 108.

The secure research environment 108 may further include an airlock service 132, which may further control access to data stored at the secure research environment 108. For example, the airlock service may store and apply rules defining what data can be extracted from the secure research environment 108, combined with other data, and provided in a final report to a user of the distributed analysis system 102. In some examples, such rules may be dependent on the type of data being requested. For example, stricter rules may apply to sensitive medical data or data which may include personally identifiable information. In some examples, the airlock service 132 may provide additional security by communicating with a user device 140 for approval of individual requests to access data at the secure research environment 108. In some examples, the airlock service 132 may apply additional rules to determine when additional approval is needed. For example, additional approval may be required by the research organization for users outside of the research organization, users with certain levels of access, and/or for certain types of data (e.g., more sensitive data).

The cloud OS services 128 may generally accept queries from the distributed analysis service 102 (e.g., after approval via authentication and/or the airlock service 132). Various components of the cloud OS services 128 may retrieve relevant data responsive to such queries and orchestrate analysis of the retrieved data at the secure research environment 108. For example, a data interface 136 may access data 138 at the secure research environment 108. In some examples, the data interface 136 may access additional data associated with the research organization but stored in other locations, such as secure locations outside of the secure research environment 108. The data interface 136 may generally utilize queries from the distributed analysis service 102 to locate relevant data and to provide the data to the virtual private cloud environment 126 for analysis. In some examples, the data interface 136 may further communicate directly with the distributed analysis service 102 to allow users of the distributed analysis service 102 to browse data available via the secure research environment 108 for analysis.

When relevant data is retrieved by the data interface 136, orchestration 134 may facilitate initial analysis of the data and the secure research environment 108 (e.g., in the virtual private cloud environment 126). For example, orchestration 134 may select compute resources for inclusion in analysis compute resources 142, monitor operations and the analysis compute resources 142 for completion of data analysis, and/or select storage locations for results 144 of such analysis. In various examples, orchestration 134 may further request allocation of compute resources 142 and/or release of compute resources 142 after completion of data analysis.

The components and architecture of the secure research environment 108 shown in FIG. 3 are exemplary. In various examples, the secure research environment 108 may include additional and/or different components not shown in FIG. 3. Further, though not shown in FIG. 3, the secure research environment 110 may include various similar components performing the functions of the components described with respect to the secure research environment 108. Other secure research environments in communication with the distributed analysis service 102 may include similar components performing similar functions.

Returning to FIG. 1, the secure compute environment 104 may generally receive data and/or intermediate results from secure research environments 108 and 110, perform additional data analysis operations and/or aggregation using the data provided by the secure research environments 108 and 110, and provide final results of the data analysis operations to the distributed analysis service. The secure compute environment 104 may generally include processing resources and storage or memory resources. In various examples, the secure compute environment 104 may be implemented via cloud computing infrastructure. Further, for additional security, the secure compute environment 104 and the data processed within the secure compute environment 104 may be inaccessible by users of the distributed analysis system 102 and/or other computing devices. For example, the intermediate results provided by the secure research environments 108 and 110 may be inaccessible until after aggregation and/or additional analysis is performed at the secure compute environment 104.

Figure 4:
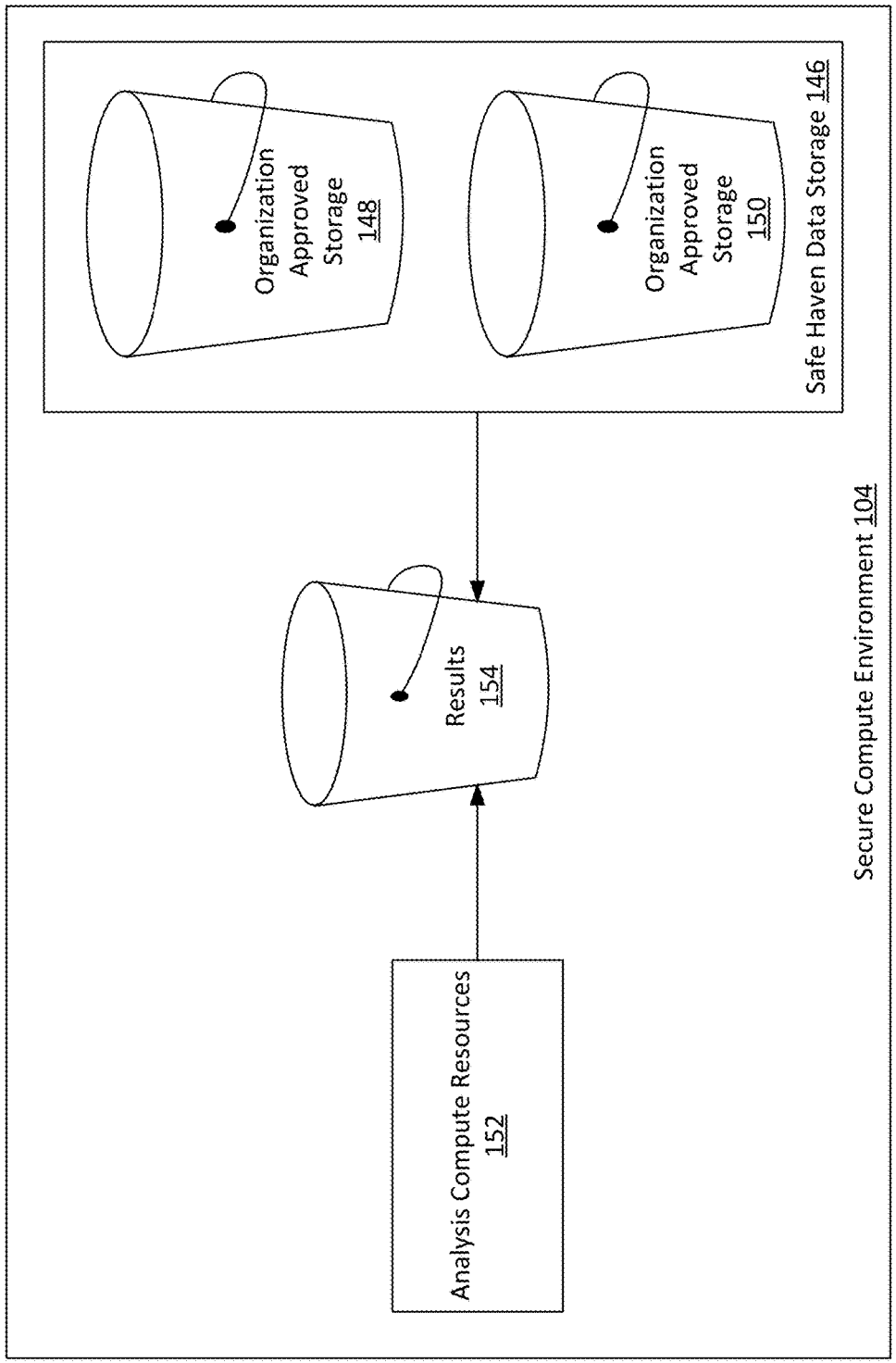
FIG. 4 is a block diagram of an example secure compute environment, in accordance with various embodiments of the disclosure.

With reference to FIG. 4, the secure compute environment 104 may include analysis compute resources 152 and storage locations holding results of data analysis operations performed using the analysis compute resources 152. The analysis compute resources 152 may be contained within a cloud environment within a container, virtual machine, or other execution environment associated with the secure compute environment 104. The analysis compute resources 152 may be dynamic. That is, the processors, memory, and/or other compute resources allocated to the secure compute environment 104 may change over time, such as based on resource usage of the secure compute environment. In some examples, the analysis compute resources 152 may be configured responsive to requests for data analysis operations and may be released after the completion of such data analysis operations. For example, a secure cluster, container, virtual machine, or other execution environment implementing the analysis compute resources 152 may be generated responsive to a request for a data analysis operation, and may be configured with an amount of processing and memory resources matching the requested data analysis operation. Accordingly, the secure compute environment 104 may efficiently utilize compute resources by releasing such resources when analysis is completed and by utilizing only the amount of resources needed to complete any given data analysis operation.

The secure compute environment 104 may further include storage locations for results 154 of analysis performed by the analysis compute resources 152 of the secure compute environment 104. In various examples, the analysis compute resources 152 may communicate with the results storage locations 154 within a private subnet or other secure networking protocol. As with the secure compute resources 152, the results storage locations 154 may be located within a cloud computing environment and may be dynamic. For example, storage resources for results storage locations 154 may be allocated to store results of specific data analysis operations and such resources may be released after results are provided to the distributed analysis system 102. Further, the results storage locations 154 may be accessible only within the secure compute environment 104 and by the cohort browser connection 120 of the distributed analysis service 102.

As further shown in FIG. 4, the secure compute environment 104 may include safe haven data storage 146. In some examples, the secure compute environment 104 may further communicate with and/or receive data from additional safe haven data storage locations. Safe haven data storage 146 may generally include storage locations configured by and/or approved by various research organizations (e.g., organization approved storage 148 and organization approved storage 150) for storing data and/or intermediate results provided to the secure compute environment 104 from the secure research environments 108 and 110. For example, the organization approved storage 148 may be accessible only by the secure research environment 108 and within the secure compute environment 104, such that the data stored at the organization approved storage is secured. Similarly, the organization approved storage 150 may be accessible only be the secure research environment 110 and within the secure compute environment 104. In various examples, other components of the secure compute environment 104 (e.g., results 154 and/or analysis compute resources 152) may have only read access to the storage locations within the safe haven data storage 146.

The components and architecture of the secure compute environment 104 and in communication with the secure compute environment 104 shown in FIG. 4 are exemplary. In various examples, the secure compute environment 104 may include additional and/or different components not shown in FIG. 4.

Returning to FIG. 1, the user device 106 may be utilized to provide input to, and receive output from, the distributed analysis service 102. For example, the user device 106 may be used to select data for analysis, send requests for specific data analysis operations, provide credentials to access the distributed analysis service and/or systems associated with research organizations, and the like. The distributed analysis service 102 may further provide results of data analysis operations to the user device 106, utilizing various displays and/or outputs of the user device 106.

Generally, the user device 106 and/or other user devices in communication with the distributed analysis service 102 may be devices belonging to end users, such as researchers or other users utilizing the distributed analysis service 102. In some implementations, users and/or user devices 106 may be associated with various levels of permissions to access the distributed analysis service 102 and/or secure research environments 108 and 110 accessible via the distributed analysis service 102. For example, user devices 106 associated with some organizations may be provided with full access to data at a secure research environment 108 (e.g., users associated with the same research organization) while other user devices 106 may be provided with partial access to such data. For example, some users may be provided with access only to anonymized data, only to certain categories of data, and the like.

In various implementations, the user device 106 and/or other user devices in communication with the distributed analysis service 102 may be implemented using any number of computing devices including, but not limited to, a computer, a laptop, mobile phone, smart phone, wearable device (e.g., AR/VR headset, smart watch, smart glasses, or the like), smart speaker, or other devices with network access. Generally, the user device 106 may include one or more processors, such as a central processing unit (CPU) and/or graphics processing unit (GPU). The user device 106 may generally perform operations by executing executable instructions (e.g., software) using the processor(s).

In various examples, the user device 106 may communicate with the distributed analysis service 102 via a public network, while the distributed analysis service 102 may communicate with the secure research environment 108, the secure research environment 110, and/or the secure compute environment 104 via a private or secured network. Networks may be implemented using one or more of various systems and protocols for communications between computing devices. In various embodiments, a network or portion of the network may be implemented using the Internet, a local area network (LAN), a wide area network (WAN), and/or other networks. In addition to traditional data networking protocols, in some embodiments, data may be communicated according to protocols and/or standards including near field communication (NFC), Bluetooth, cellular connections, and the like.

Components of the distributed analysis service 102, the secure research environment 108, the secure research environment 110, the secure compute environment 104, and/or in communication with the distributed analysis service 102 are exemplary and may vary in some embodiments. For example, in some embodiments, additional secure research environments may be in communication with the distributed analysis service 102, additional user devices may communicate with the distributed analysis service 102 and/or the secure research environments 108 or 110, and the like.

Figure 5:
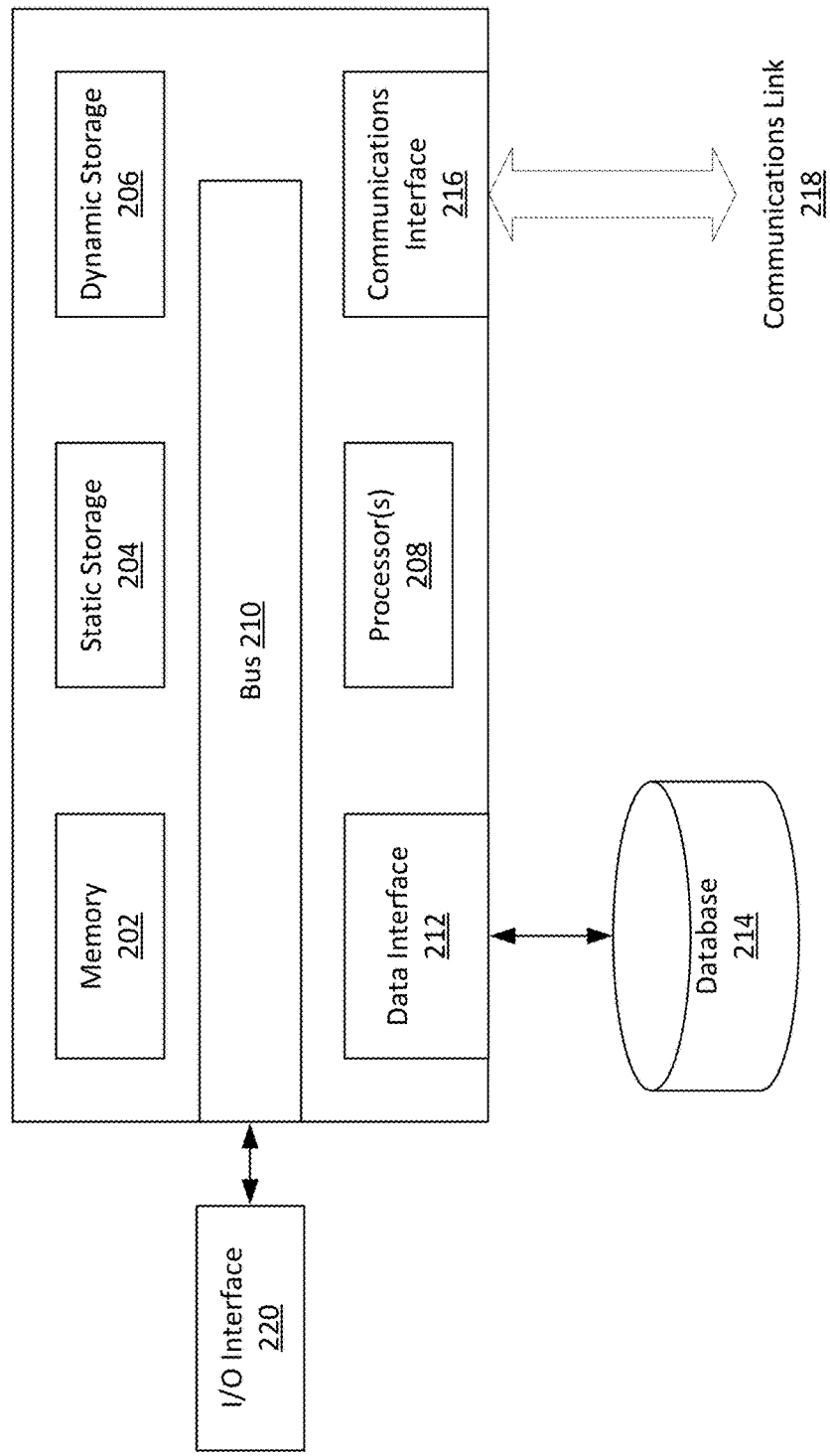
FIG. 5 is a schematic diagram of an example computer system implementing various embodiments in the examples described herein.

The distributed analysis service 102, secure research environments 108 and 110, and secure compute environment 104 may be implemented using various computing systems. Turning to FIG. 5, an example computing system 200 may be used for implementing various embodiments in the examples described herein. For example, analysis system compute resources 112, analysis compute resources 142, and/or analysis compute resources 152 may be located at one or several computing systems 200. In various embodiments, user device 106 is also implemented by a computing system 200. This disclosure contemplates any suitable number of computing systems 200. For example, the computing system 200 may be a server, a desktop computing system, a mainframe, a mesh of computing systems, a laptop or notebook computing system, a tablet computing system, an embedded computer system, a system-on-chip, a single-board computing system, or a combination of two or more of these. Where appropriate, the computing system 200 may include one or more computing systems; be unitary or distributed; span multiple locations; span multiple machines; span multiple data centers; or reside in a cloud, which may include one or more cloud components in one or more networks.

Computing system 200 includes a bus 210 (e.g., an address bus and a data bus) or other communication mechanism for communicating information, which interconnects subsystems and devices, such as processor 208, memory 202 (e.g., RAM), static storage 204 (e.g., ROM), dynamic storage 206 (e.g., magnetic or optical), communications interface 216 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), a data interface 212, and an input/output (I/O) interface 220 (e.g., keyboard, keypad, mouse, microphone). In particular embodiments, the computing system 200 may include one or more of any such components.

In particular embodiments, processor 208 includes hardware for executing instructions, such as those making up a computer program. The processor 208 circuitry includes circuitry for performing various processing functions, such as executing specific software for performing specific calculations or tasks. In particular embodiments, I/O interface 220 includes hardware, software, or both providing one or more interfaces for communication between computing system 200 and one or more I/O devices. Computing system 200 may include one or more of these I/O devices, where appropriate. One or more of these devices may enable communication between a person and computing system 200.

In particular embodiments, communications interface 216 includes hardware, software, or both providing one or more interfaces for communication (such as, for example, packet-based communication) between computing system 200 and one or more other computer systems or one or more networks. One or more memory buses (which may each include an address bus and a data bus) may couple processor 208 to memory 202. Bus 210 may include one or more memory buses, as described below. In particular embodiments, one or more memory management units (MMUs) reside between processor 208 and memory 202 and facilitate access to memory 202 requested by processor 208. In particular embodiments, bus 210 includes hardware, software, or both coupling components of the computing system 200 to each other.

Accordingly to particular embodiments, computing system 200 performs specific operations by processor 208 executing one or more sequences of one or more instructions contained in memory 202. For example, instructions for web application 114, research environment API 116, authentication 118, and cohort browser connection 120 may be contained in memory 202 and may be executed by the processor 208. Such instructions may be read into memory 202 from another computer readable/usable medium, such as static storage 204 or dynamic storage 206. In alternative embodiments, hard-wired circuitry may be used in place of or in combination with software instructions. Thus, particular embodiments are not limited to any specific combination of hardware circuitry and/or software. In various embodiments, the term "logic" means any combination of software or hardware that is used to implement all or part of particular embodiments disclosed herein.

The term "computer readable medium" or "computer usable medium" as used herein refers to any medium that participates in providing instructions to processor 208 for execution. Such a medium may take many forms, including but not limited to nonvolatile media and volatile media. Non-volatile media includes, for example, optical or magnetic disks, such as static storage 204 or dynamic storage 206. Volatile media includes dynamic memory, such as memory 202.

Computing system 200 may transmit and receive messages, data, and instructions, including program, e.g., application code, through communications link 218 and communications interface 216. Received program code may be executed by processor 208 as it is received, and/or stored in static storage 204 or dynamic storage 206, or other storage for later execution. A database 214 may be used to store data accessible by the computing system 200 by way of data interface 212. In various examples, communications link 218 may communicate with, for example, user devices to display user interfaces to the distributed analysis service 102.

Figure 6:
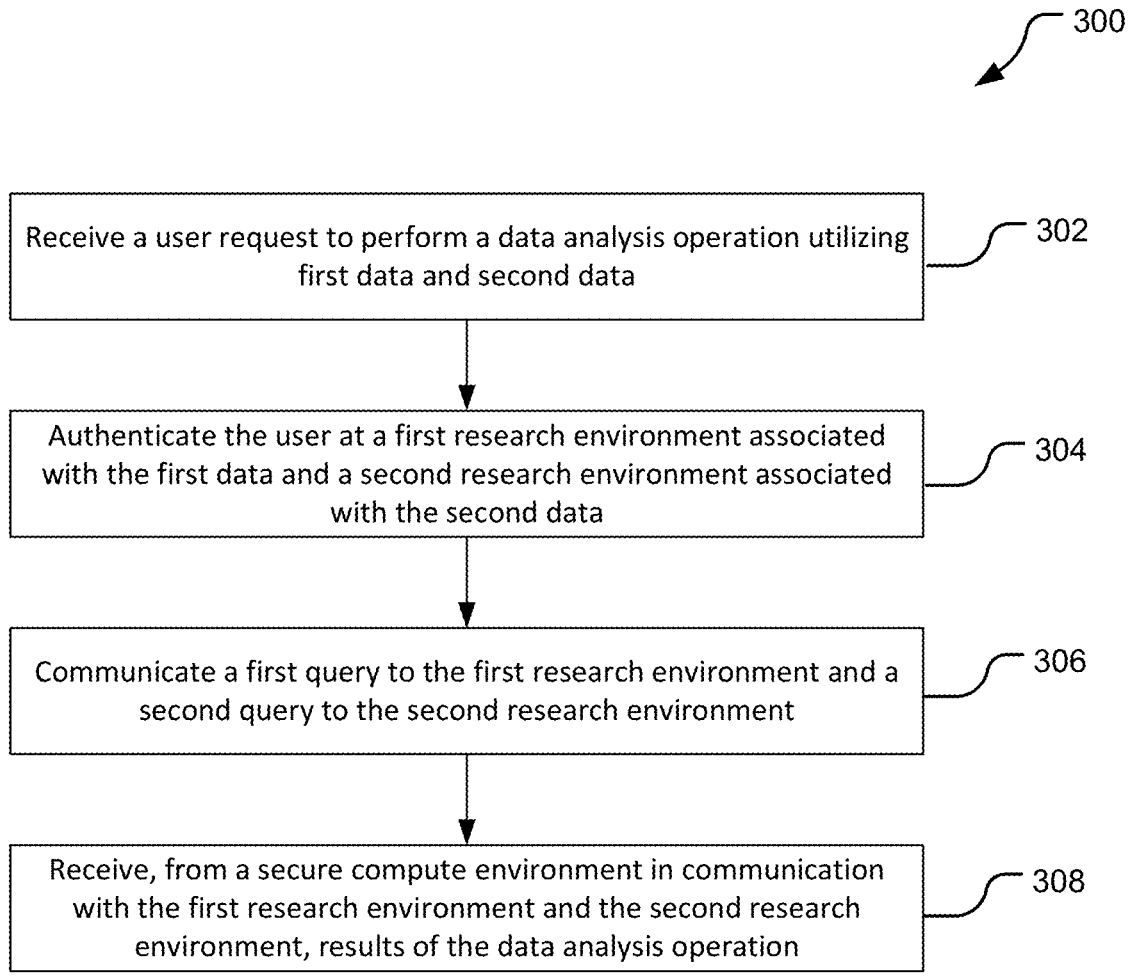
FIG. 6 illustrates an example process for performing a data analysis operation using a distributed analysis service, in accordance with various embodiments of the disclosure.

FIG. 6 illustrates an example process 300 for performing a data analysis operation using the distributed analysis service 102. At block 302, the distributed analysis service 102 receives a user request to perform the data analysis operation utilizing first data and second data. The user request may be received from a user device 106 accessing the distributed analysis service 102 through a web application 114 or other interface to the distributed analysis service 102. In some examples, the request may include a selection of the first data and the second data, which may be associated with a first research organization and a second research organization, respectively. The first data may, accordingly, be accessible from a first secure research environment (e.g., secure research environment 108) associated with the first research organization and the second data may be accessible from a second secure research environment (e.g., secure research environment 110) associated with the second research organization. For example, the web application 114 may provide, via a user interface at the user device 106, the ability to browse data available through a variety of research organizations in communication with the distributed analysis service 102 and the user may select specific data and data analysis operations to be performed on such data.

In some examples, the request may include a query for data from the first research organization and the second research organization having specific characteristics. For example, a user may request medical testing data, genomic data, or the like for individuals having a particular type of cancer. The ability to query multiple research environments for the same type of data (e.g., data having the same characteristic) may provide users with an improved user experience. In such examples, obtaining the data with such characteristics may be a data analysis operation. Additionally, the request may include additional operations to be performed on the data returned responsive to the query.

Additional information may be provided to the distributed analysis service 102 along with the request for a data analysis operation. For example, the user device 106 may transmit access credentials for the first secure research environment 108, the second research environment 110, and/or other services or environments accessible via the distributed analysis service 102. The request may further be accompanied by instructions for processing or completing the request such as, for example, a location for storage of the results of the operation, additional operations to run with received data, specific instructions for aggregation, format of a report including the results, and the like.

The distributed analysis service 102 authenticates the user at a first research environment 108 associated with the first data and a second research environment 110 associated with the second data at block 304. For example, authentication 118 may access authentication data 122 to verify and/or authenticate provided user credentials for accessing the first secure research environment 108 and the second secure research environment 110. Such authentication utilizing authentication data 122 generally provides improved security of data within the secure research environments. In various examples, such authentication may include generating a token for transmittal to the first secure research environment 108 and the second secure research environment 110 along with the request for specific data analysis operations.

At block 306, the distributed analysis service 102 communicates a first query to the first research environment 108 and a second query to the second research environment 110. In various examples, the first query may be provided in a first format and the second query may be provided in a second format, where the first format is compatible with the format used by the first secure research environment 108 and the second format is compatible with the format used by the second secure research environment 110. In various examples, the distributed analysis service 102 may automatically format queries into formats utilized by various research environments, such that the user may save time compared to manually structuring queries according to different formats.

In various examples, the first query and the second query may be provided with additional information from the distributed analysis service 102. For example, the queries may include tokens authenticating the user for access to the first secure research environment 108 and/or the second secure research environment 110. For example, such tokens may be generated by authentication 118 at the distributed analysis service 102 based on authentication data 122 and may be provided to a corresponding authentication service at the respective secure research environments (e.g., authentication 130 at the secure research environment 108) to grant access to the user and respond to the query. Other information provided with the query may include settings for anonymization and presentation of retrieved data, identification of the secure compute environment 104 and/or safe haven data storage 146, and the like.

The distributed analysis service 102 receives, from a secure compute environment 104 in communication with the first research environment 108 and the second research environment 110, results of the data analysis operation at block 308. Generally, initial analysis of the first data may be performed at the first secure research environment 108 while initial analysis of the second data may be performed at the second secure research environment 110. After the initial analysis, intermediate results may be provided to the secure compute environment 104 and/or storage locations within or in communication with the secure compute environment 104 (e.g., safe haven data storage 146). The secure compute environment 104 may perform additional analysis on the intermediate results and/or may aggregate the results received from the first secure research environment 108 and the second secure research environment 110. The secure compute environment 104 may then transmit the final results to the distributed analysis system 102.

In various examples, the cohort browser connection 120 may receive the final results from the secure compute environment 104 and may aggregate and/or format such results for presentation and/or transmission to an end user. For example, the cohort browser connection 120 may provide the received results to the web application 114 for presentation via a user interface presented by the web application 114 at the user device 106. In various examples, the cohort browser connection 120 may further perform additional actions with the final results, such as ordering or anonymizing results, transmitting results to locations other than the user device 106 (e.g., to a designated storage location), and the like.

Figure 7:
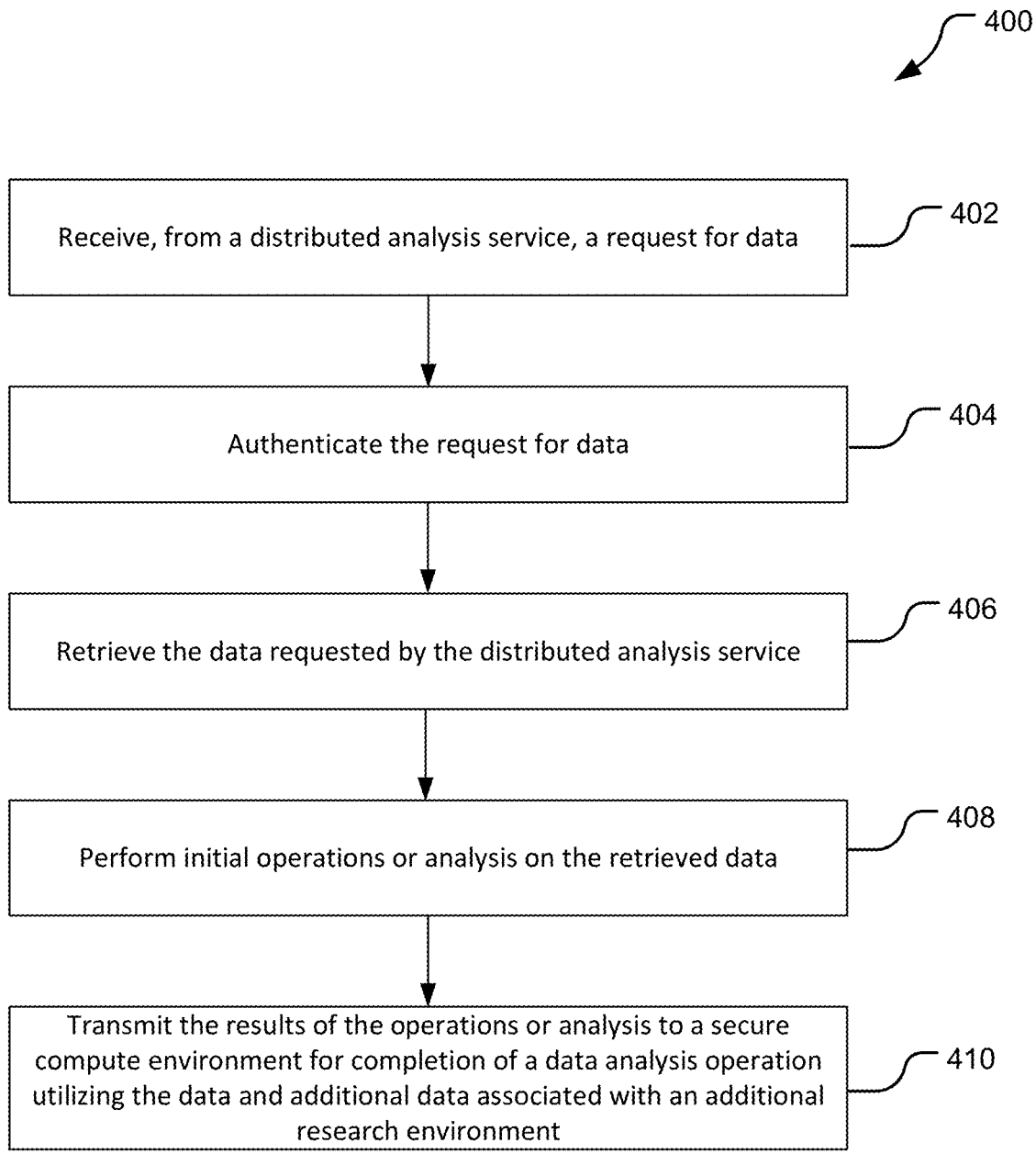
FIG. 7 illustrates an example process for performing data analysis at a secure research environment in communication with a distributed analysis service, in accordance with various embodiments of the disclosure.

FIG. 7 illustrates an example process 400 for performing data analysis at a secure research environment 108 in communication with the distributed analysis service 102. The process 400 may be similarly performed at the secure research environment 110 or at other secure research environments in communication with the distributed analysis service 102. At block 402, the secure research environment 108 receives, from the distributed analysis service 102, a request for data. In various examples, the request for data may be in the form of a query generated by the distributed analysis service 102 in a format usable by the secure research environment 108. The request may be, in various examples, a request for data accessible by the secure research environment 108 having a particular characteristic and/or requests to perform data analysis operations on data accessible by the secure research environment 108.

At block 404, the request for data is authenticated. In various examples, the request may be accompanied by other information, such as authentication information for the user device 106 to access the secure research environment 108, identification and/or location of the secure compute environment 104 and/or the safe haven data storage 146, and the like. For example, authentication information may be provided as a token generated by authentication 118 of the distributed analysis service 102. The token may be provided to the secure research environment 108, where authentication 130 may process the token to verify that the user device 106 has access to the requested data within the secure research environment 108.

In some examples, the request may be provided to the airlock service 132 of the secure research environment 108 before being fulfilled. For example, the airlock service 132 may verify that a request conforms to rules regarding access levels to specific types of data, anonymization of sensitive data, and the like. For example, incoming requests may be automatically forwarded to the airlock service 132 when the request deals with sensitive data or data that may include personally identifiable information. In some examples, requests may be held by the airlock service 132 for human approval. For example, an organization may specify that all requests for a particular type of sensitive data be approved by personnel from the research organization before any data is retrieved. In such examples, the airlock service 132 may generate a notification to a user device 140, which may access the airlock service 132 to approve the request.

The secure research environment 108 retrieves the data requested by the distributed analysis service 102 at block 406. The request may be provided to the cloud OS services 128 at the secure research environment 108 for fulfillment. The data interface 136 of the cloud OS services 128 may query various data 138 of the research organization to retrieve the requested data. For example, the data interface 136 may query all data sources constituting data 138 to retrieve data fitting a certain characteristic specified in the request. In some examples, the request may be provided to the cloud OS services 128 after authentication of the user device and/or approval of the request via the airlock service 132.

At block 408, the secure research environment 108 performs initial operations or analysis on the retrieved data. Once the data is retrieved by the data interface 136, orchestration 134 of the cloud OS services 128 may coordinate analysis of the retrieved data within the virtual private cloud environment 126. In some examples, orchestration 134 may evaluate potential compute resources which could be used for analysis of the data, and may configure such resources as part of the virtual private cloud environment 126 to perform the initial analysis of the data. For example, orchestration 134 may evaluate potential compute resources and may select compute resources as analysis compute resources 142 based on optimizations regarding monetary cost, time to process, processing power, available resources, locality to the data, security, and the like. The chosen analysis compute resources 142 may perform the initial analysis and may store the results at result storage 144.

At block 410, the secure research environment 108 transmits the results of the operations or analysis to a secure compute environment 104 for completion of a data analysis operation utilizing the data and additional data associated with an additional secure research environment. The initial results may, in some examples, be transmitted to safe haven data storage 146. Other components of the secure compute environment 104 may then access the data as needed to complete the analysis. In some examples, the initial or intermediate results may be transmitted directly to the secure compute environment 104 for analysis.

Figure 8:
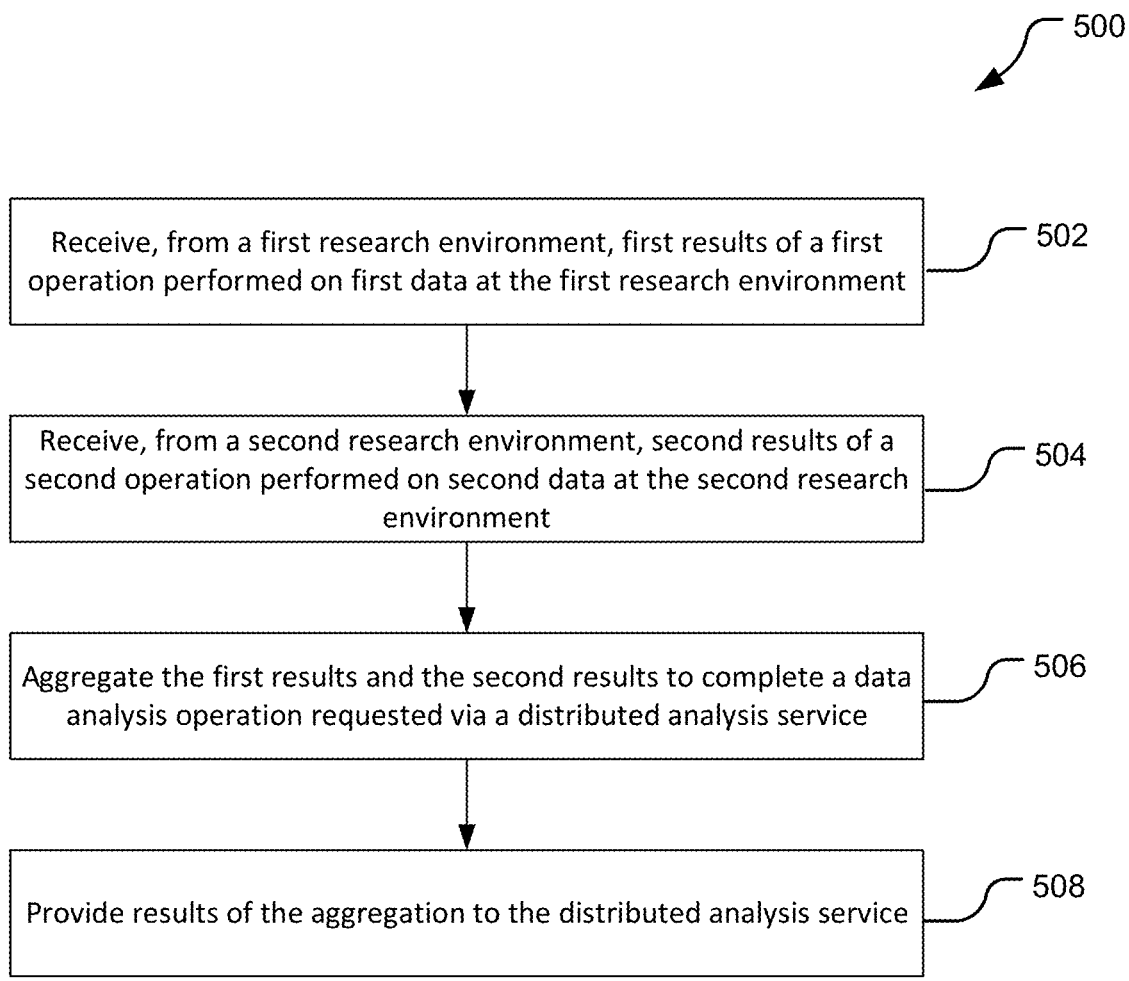
FIG. 8 illustrates an example process for performing data analysis at a secure computing environment in communication with multiple secure research environments and a distributed analysis service, in accordance with various embodiments of the disclosure.

FIG. 8 illustrates an example process 500 for performing data analysis at a secure compute environment 104 in communication with multiple secure research environments 108 and 110 and the distributed analysis service 102. At block 502, the secure compute environment 104 receives, from a first research environment 108, first results of a first operation performed on first data at the first research environment 108. At block 504, the secure compute environment 104 receives, from a second research environment 110, second results of a second operation performed on second data at the second research environment 110. In various examples, the secure compute environment 104 and/or components of the secure compute environment 104 may retrieve and/or receive such results from safe haven data storage 146. For example, safe haven data storage 146 may include storage locations 148 and 150 associated with the first secure research environment 108 and the second secure research environment 110, respectively. In some examples, the secure compute environment 104 may receive the first and second results directly from the secure research environment 108 and the secure research environment 110, respectively.

The secure compute environment 104 aggregates the first results and the second results to complete a data analysis operation requested via the distributed analysis service 102 at block 506. The secure compute environment 104 may generally utilize analysis compute resources 152 to complete analysis of the data. In some examples, such analysis may include aggregating the first results and the second results into one dataset, using both the first results and the second results in a specific data analysis pipeline, and the like. Generally, the analysis completed by the secure compute environment 104 may be specified in the initial user request to the distributed analysis service 102.

At block 508, the secure compute environment 104 provides results of the aggregation to the distributed analysis service 102. After analysis, the analysis compute resources 152 may store results 154 within the secure compute environment 104. The final results may then be transmitted to the distributed analysis service 102 from the results 154 for viewing and/or utilization by the requesting user and/or other users. For example, the results may be transmitted from the secure compute environment 104 to the cohort browser connection 120 of the distributed analysis service 102.

According to the above examples, the distributed analysis system 102 may provide a secure and streamlined solution for performing data analysis across distributed data sets associated with different organizations. The distributed analysis system 102 may provide a single entry point to multiple data sets for users, while allowing organizations to conduct processing of potentially sensitive data within their own secure environments, reducing the movement of data via various networks and providing additional security for such data. Features of certain embodiments of the distributed analysis system 102 described herein can be combined with features of other embodiments of the distributed analysis system 102 where such embodiments are technically compatible.

The technology described herein may be implemented as logical operations and/or modules in one or more systems. The logical operations may be implemented as a sequence of processor-implemented steps directed by software programs executing in one or more computer systems and as interconnected machine or circuit modules within one or more computer systems, or as a combination of both. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Further, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

The above specification, examples, and data provide a complete description of the structure and use of exemplary embodiments of the invention as defined in the claims. Although various embodiments of the claimed invention have been described above with a certain degree of particularity, or with reference to one or more individual embodiments, it is appreciated that numerous alterations to the disclosed embodiments without departing from the spirit or scope of the claimed invention may be possible. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

The invention claimed is:

1. A computer implemented method comprising:
   authenticating, by a distributed analysis service, a user at a first secure research environment and a second secure research environment, wherein authenticating the user at the first secure research environment and the second secure research environment comprises accessing a single set of authentication data associated with the user located at the distributed analysis service, wherein the single set of authentication data includes first authentication information for the first secure research environment and second authentication information for the second secure research environment;
   receiving, at the distributed analysis service, a request from the user to perform a data analysis operation, wherein the data analysis operation utilizes first data accessible by the first secure research environment and second data accessible by the second secure research environment;
   determining, by the distributed analysis service, an authorization to perform the data analysis operation based on the single set of authentication data associated with the user;
   communicating, by the distributed analysis service, a first query for the first data to the first secure research environment; communicating, by the distributed analysis service, a second query for the second data to the second secure research environment, wherein the first and second queries are communicated by a research environment application programming interface (API) coupled to the distributed analysis service;
   and receiving, at the distributed analysis service, from a secure compute environment in communication with the first secure research environment and the second secure research environment, results from the data analysis operation, wherein the results are generated at the secure compute environment using the first data received at the secure compute environment from the first secure research environment and the second data received at the secure compute environment from the second secure research environment,
   wherein the first authentication information is distinct from the second authentication information, and wherein authenticating the user at the first secure research environment and the second secure research environment further comprises:

determining, by the distributed analysis service, a first access level of the user associated with the first secure research environment based on the first authentication information; and determining, by the distributed analysis service, a second access level of the user associated with the second secure research environment based on the second authentication information.

2. The computer implemented method of claim 1, wherein the distributed analysis service, the first secure research environment, the second secure research environment, and the secure compute environment communicate via a private network connection and the research environment API.

3. The computer implemented method of claim 1, wherein the first secure research environment is associated with a first research organization and the second secure research environment is associated with a second research organization separate from the first research organization.

4. The computer implemented method of claim 1, wherein the first data is data at the first secure research environment having a characteristic, wherein the second data is data at the second secure research environment having the characteristic.

5. The computer implemented method of claim 1, further comprising configuring compute resources of the secure compute environment, wherein the compute resources of the secure compute environment generate the results.

6. The computer implemented method of claim 1, further comprising configuring the secure compute environment such that the secure compute environment is inaccessible during generation of the results at the secure compute environment.

7. The computer implemented method of claim 1, wherein authenticating the user at the first secure research environment and the second secure research environment comprises generating a first authentication token for communication to the first secure research environment and generating a second authentication token for communication to the second secure research environment.

8. A system comprising: a user device; and a processor coupled to the user device and including a distributed analysis service configured to:
authenticate a user at a first secure research environment and a second secure research environment, wherein authenticating the user at the first secure research environment and the second secure research environment comprises accessing a single set of authentication data associated with the user located at the distributed analysis service, wherein the single set of authentication data includes first authentication information for the first secure research environment and second authentication information for the second secure research environment, receive, from the user via the user device, a request to perform a data analysis operation, wherein the data analysis operation utilizes first data accessible by the first secure research environment and second data accessible by the second secure research environment, determine an authorization to perform the data analysis operation based on the single set of authentication data associated with the user, communicate a first query for the first data to the first secure research environment, and communicate a second query for the second data to the second secure research environment, wherein the first and second queries are communicated by a research environment application programming interface (API) coupled to the distributed analysis service; and a secure compute environment in communication with the distributed analysis service, the first secure research environment, and the second secure research environment, wherein the secure compute environment is configured to: generate results of the data analysis operation using the first data received from the first secure research environment and the second data received from the second secure research environment, and provide the results of the data analysis operation to the distributed analysis service,
wherein the first authentication information is distinct from the second authentication information, and wherein authenticating the user at the first secure research environment and the second secure research environment further comprises:
determining, by the distributed analysis service, a first access level of the user associated with the first secure research environment based on the first authentication information; and determining, by the distributed analysis service, a second access level of the user associated with the second secure research environment based on the second authentication information.

9. The system of claim 8, wherein the distributed analysis service is further configured to communicate with the first secure research environment and the second secure research environment using a private network connection and the research environment API.

10. The system of claim 8, wherein the first secure research environment is associated with a first research organization and the second secure research environment is associated with a second research organization separate from the first research organization.

11. One or more non-transitory computer readable media encoded with instructions which, when executed by one or more processors of a distributed analysis service, cause the distributed analysis service to perform operations comprising: authenticating a user at a first secure research environment and a second secure research environment, wherein authenticating the user at the first secure research environment and the second secure research environment comprises accessing a single set of authentication data associated with the user located at the distributed analysis service, wherein the single set of authentication data includes first authentication information for the first secure research environment and second authentication information for the second secure research environment; receiving a request from the user to perform a data analysis operation, wherein the data analysis operation utilizes first data accessible by the first secure research environment and second data accessible by the second secure research environment: determining an authorization to perform the data analysis operation based on the single set of authentication data associated with the user: communicating a first query for the first data to the first secure research environment; communicating a second query for the second data to the second secure research environment, wherein the first and second queries are communicated by a research environment application programming interface (API) coupled to the distributed analysis service; and receiving, from a secure compute environment in communication with the first secure research environment and the second secure research environment, results from the data analysis operation, wherein the results are generated at the secure compute environment using the first data received at the secure compute environment from the first secure research environment and the second data received at the secure compute environment from the second secure research environment, wherein the first authentication information is distinct from the second authentication information, and wherein authenticating the user at the first secure research environment and the second secure research environment further comprises:

determining, by the distributed analysis service, a first access level of the user associated with the first secure research environment based on the first authentication information; and determining, by the distributed analysis service, a second access level of the user associated with the second secure research environment based on the second authentication information.

12. The one or more non-transitory computer readable media of claim 11, wherein the distributed analysis service communicates with the first secure research environment, the second secure research environment, and the secure compute environment via a private network connection and the research environment API.

13. The one or more non-transitory computer readable media of claim 11, wherein the first secure research environment is associated with a first research organization and the second secure research environment is associated with a second research organization separate from the first research organization.

14. The one or more non-transitory computer readable media of claim 11, wherein the first data is data at the first secure research environment having a characteristic, wherein the second data is data at the second secure research environment having the characteristic.

15. The one or more non-transitory computer readable media of claim 11, wherein the operations further comprise configuring compute resources of the secure compute environment, wherein the compute resources of the secure compute environment generate the results.

16. The one or more non-transitory computer readable media of claim 11, wherein the operations further comprise configuring the secure compute environment such that the secure compute environment is inaccessible during generation of the results at the secure compute environment.

17. The one or more non-transitory computer readable media of claim 11, wherein authenticating the user at the first secure research environment and the second secure research environment comprises generating a first authentication token for communication to the first secure research environment and generating a second authentication token for communication to the second secure research environment.

18. The computer implemented method of claim 1, wherein determining the authorization to perform the data analysis operation comprises:

determining, by the distributed analysis service, a first classification of the first data;

determining, by the distributed analysis service, a second classification of the second data; and determining, by the distributed analysis service, the authorization to perform the data analysis operation based on a first rule associated with a first classification and a second rule associated with the second classification.

19. The computer implemented method of claim 1, wherein the secure compute environment comprises a data storage configured to store the first data, the second data, and an intermediate result of the data analysis operation, and wherein the data storage is accessible only by the secure compute environment.

* * * * *